Patented Aug. 22, 1939

2,170,385

UNITED STATES PATENT OFFICE

2,170,385

ANTHRAQUINONE ACID WOOL DYESTUFFS

Henry R. Lee, South Milwaukee, and David X. Klein, Milwaukee, Wis., assignors to E. I. du Pont de Nemours & Company, Wilmington, Del., a corporation of Delaware No Drawing. Application March 24, 1938, Serial No. 197,861

2 Claims. (Cl. 260—374)

This invention relates to the preparation of acid wool dyestuffs of the anthraquinone series and more particularly to the preparation of improved colors of the "bromamine acid" type wherein 1-amino-4-arylamino-2-anthraquinonesulfonic acids are produced which carry in the 5 position a nitro group.

The acid wool dyestuffs heretofore prepared from "bromamine acid", namely from 1-amino-4-bromo-2-anthraquinonesulfonic acid, by condensation with arylamines are well known. These compounds in general, however, do not dye satisfactorily from neutral solutions and a large number of substituents have been introduced into the aryl radicals of the molecule to vary the shade of the dyestuff and also to improve the dyeing properties.

We have found that new acid wool dyestuffs of this type which have improved neutral dyeing properties can be prepared by introducing a nitro group into the 5 position of the anthraquinone molecule of the 1-amino-4-arylamino-2-anthraquinonesulfonic acids. The resulting colors are not only improved in neutral dyeing properties but they also dye in much greener shades than the compounds which do not carry the nitro group, thereby providing a very desirable range of blue to greenish blue dyestuffs.

These compounds may be prepared by employing as one of the intermediates 1-amino-4-bromo - 5 - nitro- 2- anthraquinonesulfonic acid, which compound is more particularly described and claimed in our copending application Serial No. 127,566 filed February 24, 1937. According to the process described in our copending application, 1-amino-5-nitroanthraquinone is converted to the sulfonic acid by reacting upon it with chlorosulfonic acid in an inert organic solvent at temperatures above 145° C. The resulting 1-amino-5-nitro-2-anthraquinonesulfonic acid is then mono-brominated by any desired method, the bromine being introduced into the 4 position. On condensation of this 1-amino-4-bromo-5-nitro-2-anthraquinonesulfonic acid with arylamines of the benzene series, the new acid wool dyestuffs are obtained which dye in greener shades than the unsubstituted product and which exhibit improved neutral dyeing properties.

The following examples are given to illustrate a preferred method for preparing these colors, it being understood however that the examples are given as illustrations and not as limitations upon our invention. The parts used are by weight.

Example 1

93 parts of 1-amino-4-bromo-5-nitro-2-anthraquinonesulfonic acid potassium salt, 74.4 parts of aniline, 1200 parts of water, 57.4 parts of sodium bicarbonate and 1.4 parts of copper acetate are heated with agitation to 75–80° C. for seven hours. The blue mass is cooled to 25° C. while stirring. It is then filtered and washed with 400 parts of 2% brine.

To purify, the cake may be dissolved in 2000 parts of water with 7 parts of charcoal at the boil. This solution is then filtered and salted at 75° C. to 1.67% NaCl content. The mass is cooled to 25° C. with stirring, and filtered. It is washed then with 1000 parts of 1.67% brine, and dried. The dyestuff obtained in high yield dyes wool extremely bright blue-green shades having good fastness properties.

Example 2

9.3 parts of 1-amino-4-bromo-5-nitro-2-anthraquinonesulfonic acid potassium salt, 5.66 parts of p-amino-methylacetanilide, 5.66 parts of sodium bicarbonate. 0.4 part of copper sulfate, and 64 parts of water are heated at 100° C. for four hours. The resulting product is filtered off cold, clarified in the usual manner and isolated by salting to a 10% salt solution. The final dyestuff is obtained in high yields. It dyes wool in blue shades of good fastness properties.

Similar neutral or acid dyeing wool dyestuffs of this series may be prepared by condensing 1-amino- 4 -bromo- 5 -nitro- 2 -anthraquinonesulfonic acid with the following arylamines to give dyestuffs which dye in blue to greenish blue shades:

| | |
|---|---|
| o-Phenetidine | Greenish blue |
| p-Amino-dimethyl-benzamide | Do |
| Meta-chloroaniline | Blue |
| Meta-toluidine | Greenish blue |
| Pseudo-cumidine | Do |

Claims:

1. Acid wool dyestuffs of the following general formula

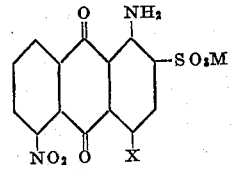

wherein M stands for an element of the class consisting of hydrogen and alkali-metals and X stands for an arylimino radical of the benzene series.

2. A compound of the class consisting of 1-amino- 4 -anilido- 5 -nitro-2-anthraquinonesulfonic acid and its alkali-metal salts.

HENRY R. LEE.
DAVID X. KLEIN.